H. LYNN.
VEHICLE FENDER.
APPLICATION FILED OCT. 13, 1913.
1,101,943.
Patented June 30, 1914.
2 SHEETS—SHEET 1.
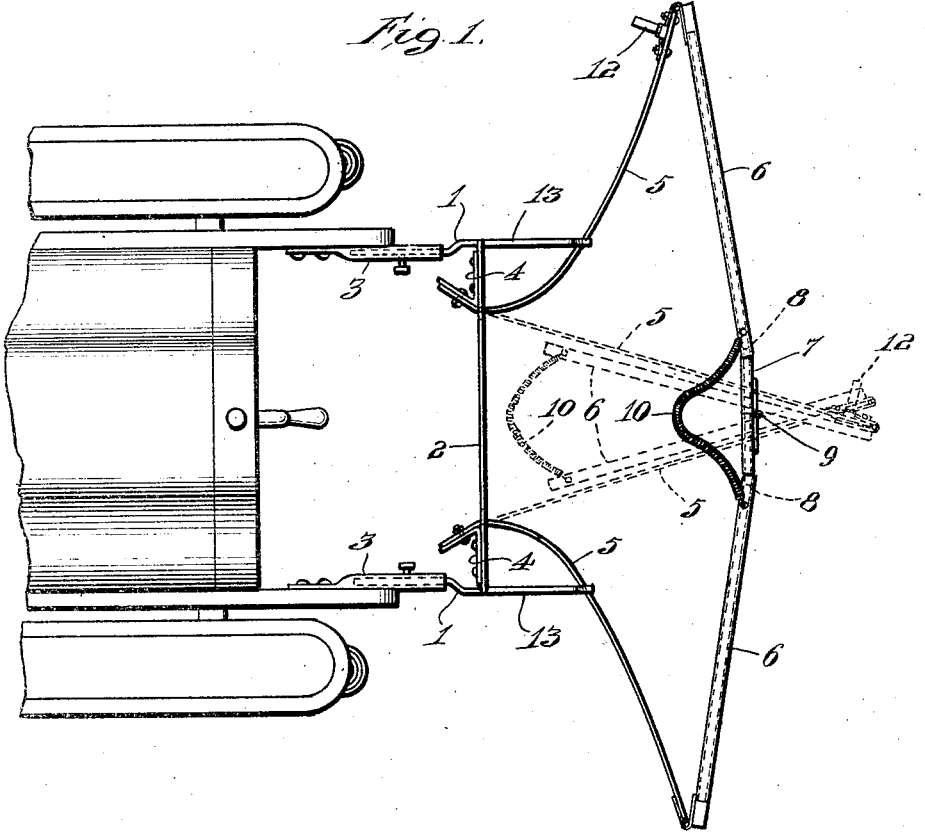
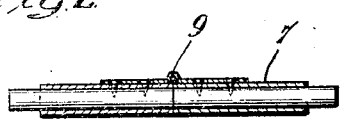
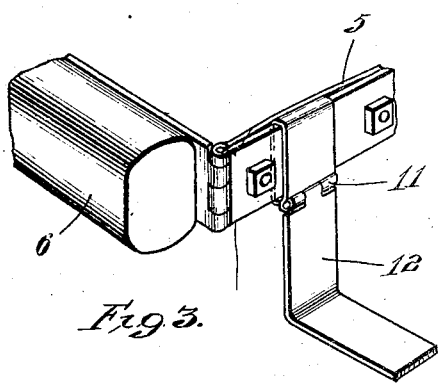
Witnesses:
H. S. Bull
A. A. Olson
Inventor
Hugh Lynn
By Joshua R. H. Rowe
His Attorney

UNITED STATES PATENT OFFICE.

HUGH LYNN, OF CHICAGO, ILLINOIS.

VEHICLE-FENDER.

1,101,943.	Specification of Letters Patent.	Patented June 30, 1914.

Application filed October 13, 1913. Serial No. 794,888.

*To all whom it may concern:*

Be it known that I, HUGH LYNN, a citizen of the United States, and a resident of the city of Chicago, county of Cook, and State of Illinois, have invented certain new and useful Improvements in Vehicle-Fenders, of which the following is a specification.

My invention relates to improvements in vehicle fenders and has for its object the production of a fender which will be of improved construction and efficient in operation.

Other objects will appear hereinafter.

The invention consists in the combinations and arrangements of parts hereinafter described and claimed.

Figure 4:
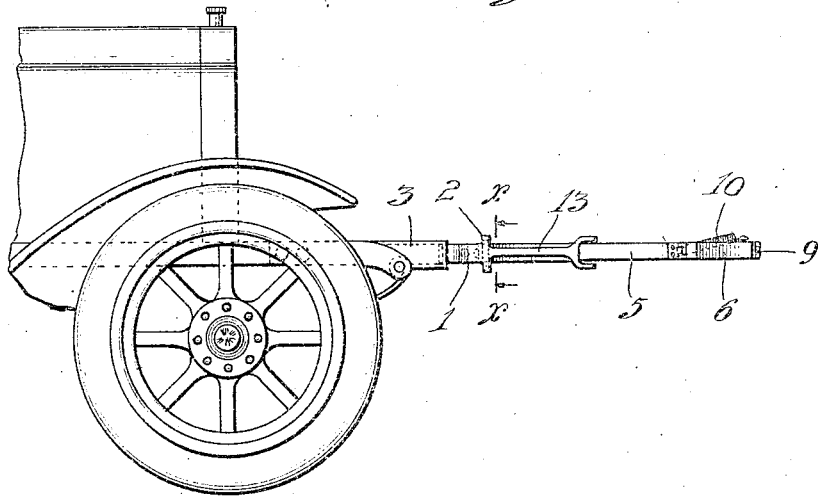
Figure 5:
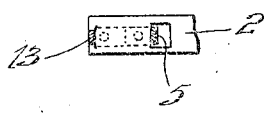

The invention will be best understood by reference to the accompanying drawing forming a part of this specification, and in which, Figure 1 is a top plan view of the forward end portion of an automobile to which is applied a fender embodying my invention, said fender being shown set for operation in full lines and in released position in dotted lines, Fig. 2 is a sectional view of the knee joint member, included in the construction, detached, Fig. 3 is a perspective view of a portion of the fender illustrating the pivoted catch which automatically locks the resilient arms of the fender in convergent positions when released. Fig. 4 is a side elevation of Fig. 1, and Fig. 5 is a sectional detail taken on substantially line $x$—$x$ of Fig. 4.

The preferred form of construction, as illustrated in the drawing comprises a supporting or attaching frame comprising two parallel side members 1 and a transversely extending member 2 which are rigidly secured together. The rearward ends of the members 1 engage socket members 3 which are secured rigidly to the forward end portion of the frame of the vehicle at the front end of the latter, said members 1 being releasably secured in position by set screws or other suitable securing devices as shown. Although the fender is herein shown applied to an automobile, it is of course understood that the use thereof is not limited in this respect, since the same may as readily be used upon street cars or other similar vehicles.

Secured to the cross piece 2 near the respective ends thereof are angular members 4, to which are connected the inner or rearward ends of forwardly projecting spring arms 5, the arrangement being such that said arms normally assume convergent positions as shown in dotted lines in Fig. 1.

Pivotally connected to the outer or forwardly projecting ends of the spring arms 5 are lock arms 6. The adjacent ends of arms 6 are spaced apart, when in their normal position, by a member 7. Said member 7 is made up of two parts pivoted together and forming a knee joint adapted to "break" backwardly with respect to the vehicle and is held between the arms 6 by having its ends inserted in sockets 8 in the adjacent ends of said arms. The arrangement is such that, when the arms 6 are moved on their pivotal points through a line extending between such pivotal points, to the rear thereof, the member 7 will be free and drop of its own weight from its connection with said arms 6. Arms 6 and member 7 are held in their full line normal positions, indicated in Fig. 1, by the resilient arms 5, as will be readily understood. The inner ends of the lock arms 6 are also connected by means of a helical tension spring 10 which, when the device is in use, serves in the capacity of a cushion or shock absorbing member.

With a fender of the construction set forth it will be seen that in the event of the vehicle being driven into contact with a person the latter, in contacting with the fender, will cause the joint 9 to break inwardly and hence the arms 6 to rock rearwardly thereby releasing the outer ends of the arms 5 which, in returning to normal position will embrace the body of the person and serve to hold the person in an upright position, as will be readily understood. The knee joint member 7 of course drops from engagement with the lock arms 6 in this operation, the spring 10 serving as a cushion for the body of the person, absorbing any shock or jar which otherwise would be incidental to the collision, thus preventing injury. At the outer end of one of the arms 5 is pivoted at 11 an angular catch 12 which is adapted, upon swinging of the arms 5 to their normal positions to automatically engage the other of said arms and prevent outward swinging of said arms to release the person which is embraced in the fender until the vehicle has been brought to a stop. After the vehicle has been brought to a stop the catch 12 may be rocked to disengaging position and the arms 5 rocked outwardly to release the person. The outer ends of arms 5 are disposed in different horizontal planes in order to permit of the same passing one another and also to permit of the catch 12 engaging the other arm.

Extending forwardly from the frame members 1 are arms 13 having forked or bifurcated outer ends, as clearly shown in Fig. 4, adapted to releasably engage the spring arms 5, when the latter are in divergent positions, to prevent relative vertical movement or vibration. The arms 13 engage the arms 5 only loosely so that upon release of the latter through tripping of the knee joint member 7 said spring arms will be free to rock inwardly.

A fender of the construction set forth will be found durable and economical in construction and effectual in operation.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination with a vehicle, of two forwardly extending resilient arms adapted, when released, to assume convergent positions relatively to each other; lock arms extending between the outer ends of said resilient arms and pivoted thereto adapted to normally hold the same divergent, and a knee joint member interposed between and loosely connected with the inner ends of said lock arms, substantially as described.

2. The combination with a vehicle, of two forwardly extending resilient arms adapted, when released, to assume convergent positions relatively to each other; lock arms extending between the outer ends of said resilient arms and pivoted thereto adapted to hold the same divergent; a knee joint member interposed between and loosely connected with the inner ends of said lock arms, and a resilient element also connecting said inner ends of said lock arms, substantially as described.

3. The combination with a vehicle, of two forwardly extending resilient arms adapted, when released, to assume convergent positions relatively to each other; lock arms extending between the outer ends of said resilient arms and pivoted thereto adapted to hold the same divergent; a knee joint member interposed between and loosely connected with the inner ends of said lock arms; and a helical tension spring also connecting the inner ends of said lock arms, substantially as described.

4. The combination with a vehicle, of two forwardly extending resilient arms adapted, when released, to assume convergent positions relatively to each other; lock arms extending between the outer ends of said resilient arms and pivoted thereto adapted to hold the same divergent, and a knee joint member interposed between the inner ends of said lock arms and having its outer ends loosely engaging sockets provided at said inner ends of said lock arms, substantially as described.

5. The combination with a vehicle, of two forwardly extending resilient arms adapted, when released, to assume convergent positions relatively to each other; lock arms extending between the outer ends of said resilient arms and pivoted thereto adapted to hold the same divergent; a knee joint member interposed between the inner end of said lock arms and having its outer ends loosely engaging sockets provided at said inner ends of said lock arms, and a resilient element also connecting the inner ends of said lock arms, substantially as described.

6. The combination with a vehicle, of two forwardly extending resilient arms adapted, when released, to assume convergent positions relatively to each other; lock arms extending between the outer ends of said resilient arms and pivoted thereto adapted to hold said resilient arms divergent against the tension thereof, and a knee joint member interposed between and loosely connected with the inner ends of said arms, the joint of said last mentioned member being adapted to break rearwardly, the tension of said resilient arms serving to normally hold said joint extended, substantially as described.

7. The combination with a vehicle, of two forwardly extending resilient arms adapted, when released, to assume convergent positions relatively to each other; lock arms extending between the outer ends of said resilient arms and pivoted thereto and adapted to normally hold the same divergent; a knee joint member interposed between and loosely connected with the inner ends of lock arms; and means releasably engaging with said resilient arms, when in divergent positions, for holding said arms against relative vertical movement, substantially as described.

8. The combination with a vehicle, of two forwardly extending resilient arms adapted, when released, to assume convergent positions relatively to each other; lock arms extending between the outer ends of said resilient arms and pivoted thereto and adapted to normally hold the same divergent; a knee joint member interposed between and loosely connected with the inner ends of said lock arms, and forked members releasably engaging with said resilient arms, when in divergent positions, for holding said arms against relative vertical movement, substantially as described.

9. The combination with a vehicle, of two forwardly extending resilient arms adapted, when released, to assume convergent positions relatively to each other; lock arms extending between the outer ends of said resilient arms and pivoted thereto and adapted to normally hold the same divergent; a knee joint member interposed between and loosely connected with the inner ends of said lock arms, and means adapted upon release of said resilient arms and inward swinging thereof to automatically lock said arms in divergent positions, substantially as described.

10. The combination with a vehicle, of two forwardly extending resilient arms adapted, when released, to assume convergent positions relatively to each other; lock arms extending between the outer ends of said resilient arms and pivoted thereto and adapted to normally hold the same divergent; a knee joint member interposed between and loosely connected with the inner ends of said lock arms, and a pivoted catch on one of said resilient arms adapted upon release of the latter and inward swinging of the forward ends thereof to automatically engage the other of said arms to lock said arms in divergent positions, substantially as described.

In testimony whereof I have signed my name to this specification in the presence of two subscribing witnesses.

HUGH LYNN.

Witnesses:
JOSHUA R. H. POTTS,
HELEN F. LILLIS.